No. 849,536. PATENTED APR. 9, 1907.
R. E. FLYBERG.
FIREARM.
APPLICATION FILED APR. 6, 1906.

4 SHEETS—SHEET 1.

Witnesses
G. R. Thomas
J. C. Jones

Inventor
R. E. Flyberg
By Chandler & Chandler
Attorneys

No. 849,536.  
PATENTED APR. 9, 1907.  
R. E. FLYBERG.  
FIREARM.  
APPLICATION FILED APR. 6, 1906.

4 SHEETS—SHEET 2.

Witnesses  
G. R. Thomas  
F. C. Jones

Inventor  
R. E. Flyberg  
By Chandler & Chandler  
Attorneys

No. 849,536. PATENTED APR. 9, 1907.
R. E. FLYBERG.
FIREARM.
APPLICATION FILED APR. 6, 1906.
4 SHEETS—SHEET 3.
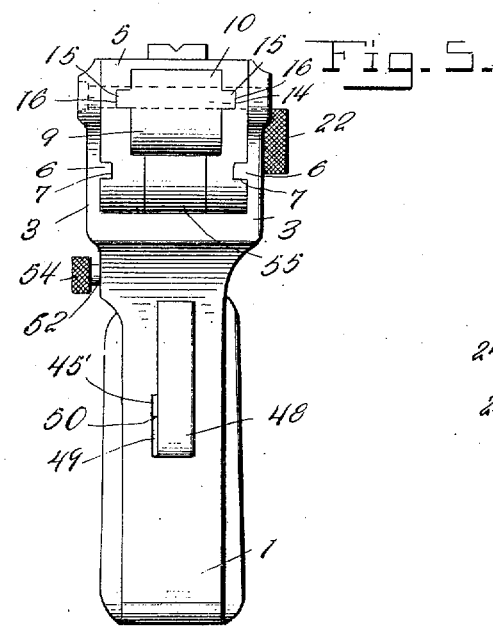
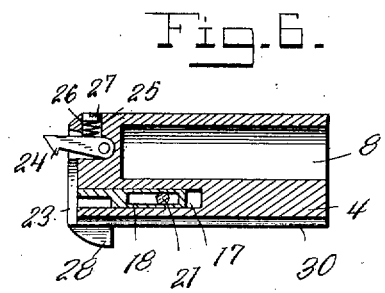
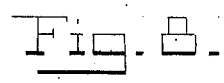
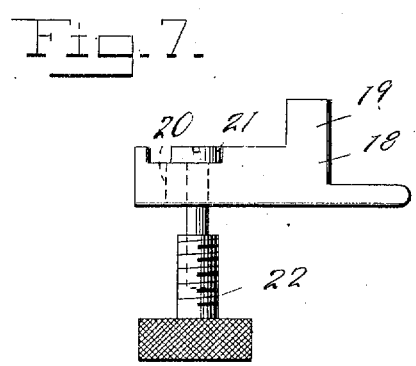
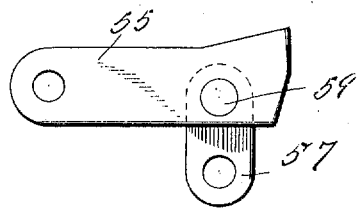
WITNESSES:
G. R. Thomas
J. C. Jones
INVENTOR
R. E. Flyberg
BY Chandler & Chandler
Attorneys No. 849,536. PATENTED APR. 9, 1907.
R. E. FLYBERG.
FIREARM.
APPLICATION FILED APR. 6, 1906.
4 SHEETS—SHEET 4.
Fig. 9.
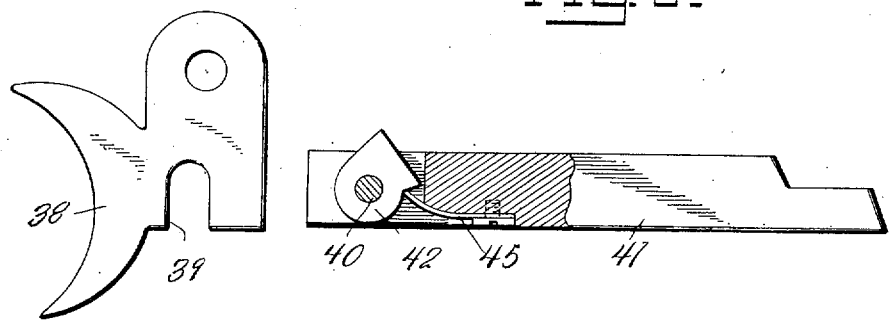
Fig. 10.
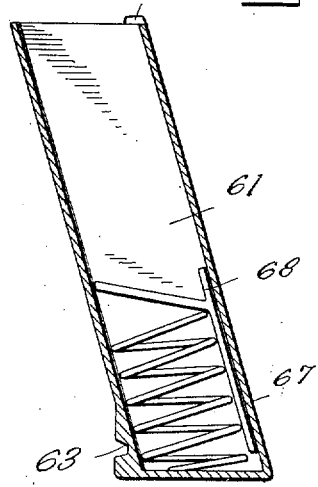
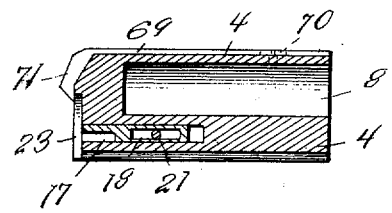
Fig. 11.
WITNESSES:
G. R. Thomas
F. C. Jones
INVENTOR
R. E. Flyberg
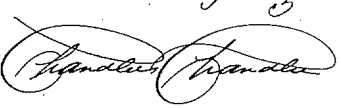
Attorneys

UNITED STATES PATENT OFFICE.

RICHARD E. FLYBERG, OF HALSTAD, MINNESOTA.

FIREARM.

No. 849,536.　　Specification of Letters Patent.　　Patented April 9, 1907.

Application filed April 6, 1906. Serial No. 310,281.

*To all whom it may concern:*

Be it known that I, RICHARD E. FLYBERG, a citizen of the United States, residing at Halstad, in the county of Norman, State of Minnesota, have invented certain new and useful Improvements in Firearms; and I do hereby declare the following to be a full, clear, and exact description of the invention, such as will enable others skilled in the art to which it appertains to make and use the same.

This invention relates to firearms, and more particularly to that class in which the recoil resulting from the firing of one cartridge is utilized to bring another cartridge in position for firing and to eject the fired shell.

The objects of my invention are to provide a firearm in which a number of cartridges may be carried and to provide means for preventing pulling of the trigger until it is desired to fire the arm.

The invention further includes means for preventing operation of the parts of the arm after the last cartridge in the magazine has been fired.

Figure 1:
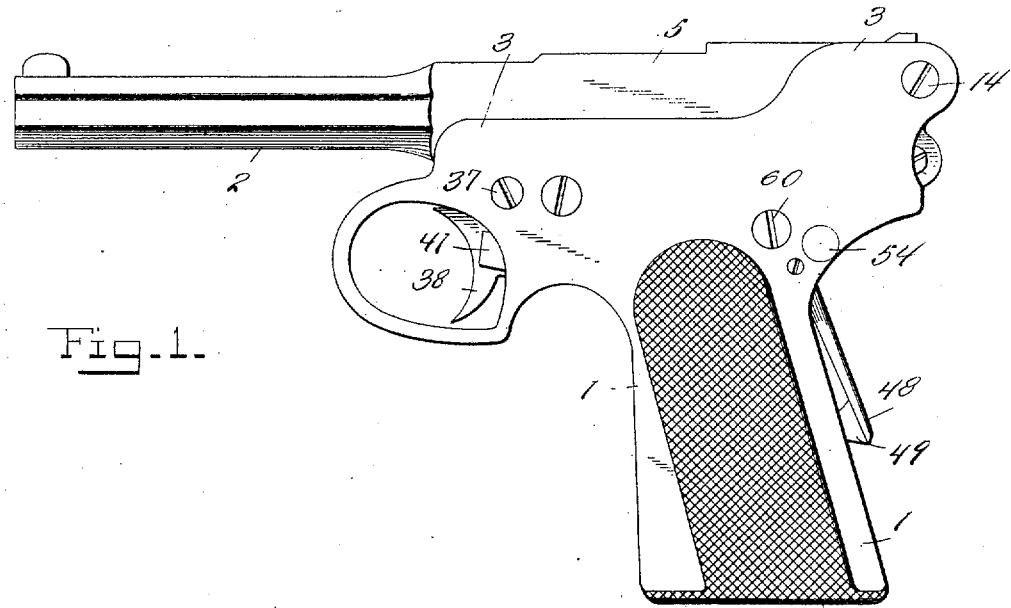
Figure 2:
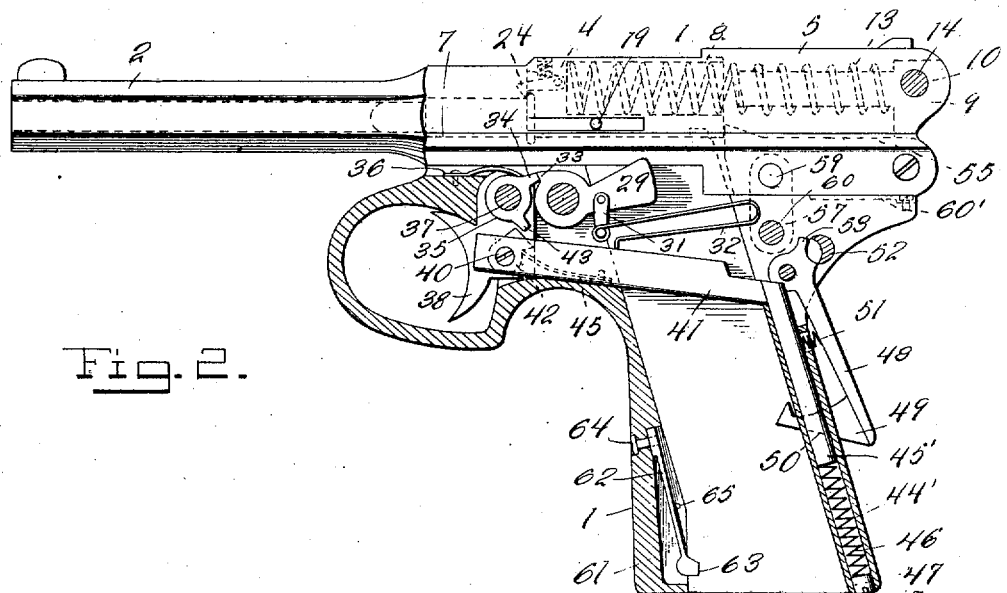
Figure 3:
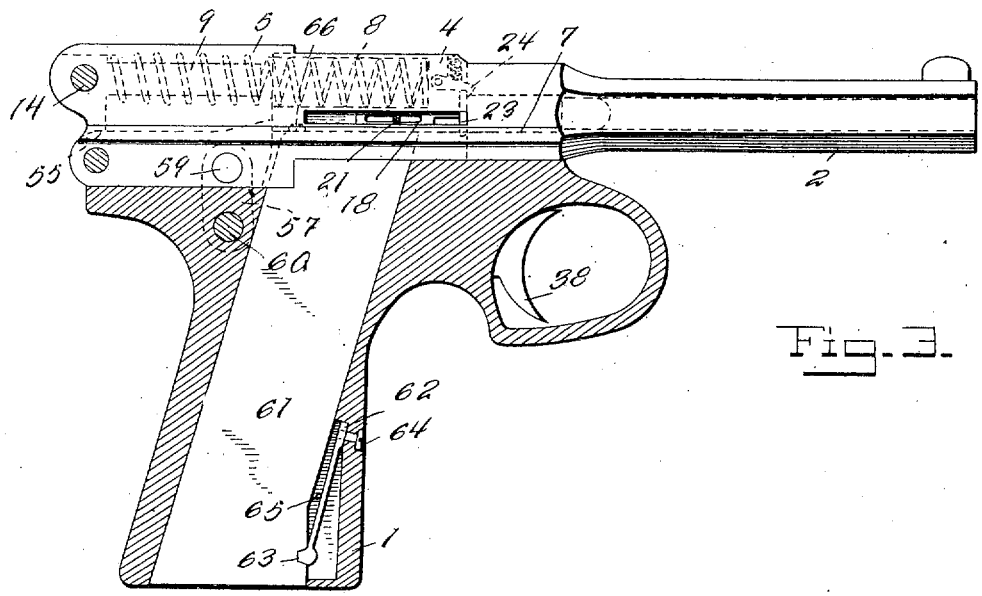
Figure 4:
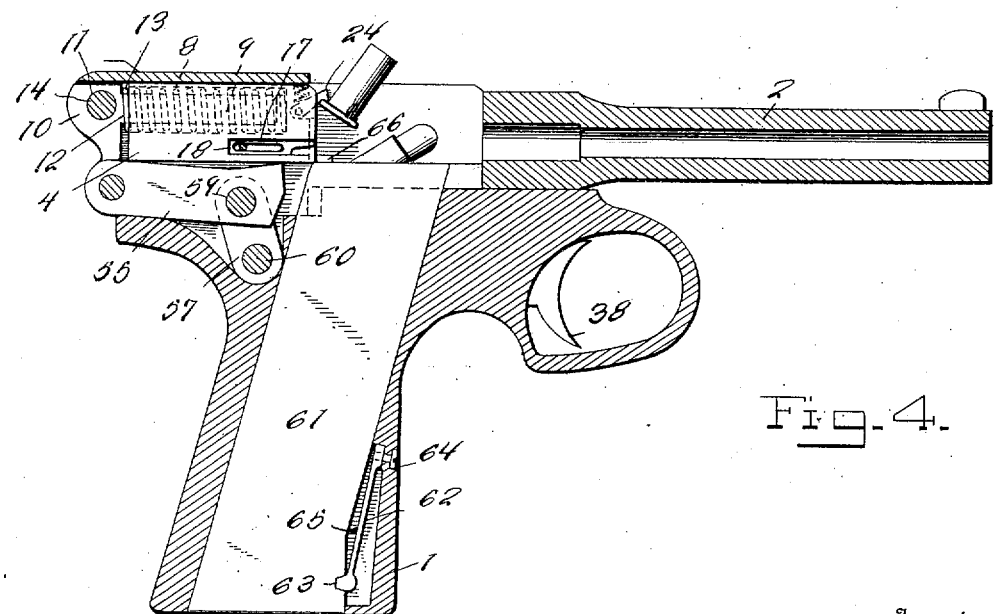

In the accompanying drawings, Figure 1 is a side elevation of a pistol embodying my invention. Fig. 2 is a similar view of one side of the same, the casing being broken away. Fig. 3 is a similar view of the other side of the same. Fig. 4 is a side elevation with the casing removed, showing the parts in the position they assume after firing. Fig. 5 is a rear elevation. Fig. 6 is a detail sectional view through the breech-block. Fig. 7 is a detail top plan view of the firing-pin. Fig. 8 is a detail side elevation of the locking-bolt for the breech-block. Fig. 9 is a detail side elevation of the trigger and its associated parts. Fig. 10 is a detail vertical sectional view through the magazine. Fig. 11 is a detail sectional view through a modified form of breech-block.

Referring to the drawings, 1 denotes the stock of my pistol, and 2 the barrel of the same. The stock is provided at its upper end with spaced walls 3, between which is seated the breech of the barrel 2, the breech-block 4, and a guide-block 5, the latter being held in position by means of ribs 6 on the walls 3 of the stock, the said ribs being engaged in grooves 7 in the said guide-block 5.

The breech-block 4 is slidably mounted in the recess formed by the walls 3 of the stock and is provided with a longitudinal bore 8, which terminates slightly short of the front end of the same. The guide-block 5 is arranged to receive the breech-block 4, and between the walls 3 in rear of the guide-block is a spring-guide 9, including a head 10, having a transverse aperture 11 and a guide-pin 12, over which is engaged a helical spring 13, which is also engaged in the bore 8 of the breech-block. Through the aperture 11 in the head 10 and the walls 3 is engaged a screw 14.

On each side of the breech-block 4 is formed a rib 15, which is slidably engaged in grooves 16, formed in the guide-block 5, and in the forward end of the block below the bore 8 is formed a slot 17, in which is slidably mounted a firing-pin 18, provided on its outer edge with a lug 19 for engagement by the hammer of the pistol. Engaged horizontally through a slot 20 in the pin 18 is a screw 21, which has its other end engaged in the end of a screw 22, which is in turn screwed into the breech-block 4. In the forward end of the breech-block is formed a recess 23, in which is received the head of a cartridge, and directly above said recess in the breech-block is pivoted an extractor-latch 24, which is held in engagement with the head of a cartridge in said recess by means of a helical spring 25, seated in a bore 26 and held therein by means of a screw-plug 27. On the under side of the breech-block 4 and to one side of the center of the same is formed a lug 28, which is adapted to engage a hammer 29 to cock the same. A groove 30 extends centrally and longitudinally of the under side of the breech-block for a purpose presently to be explained.

The hammer 29 is pivoted in the stock to one side of the center thereof and is provided with the usual link 31 and spring 32. A lug 33 is formed on the hammer and is provided with an abrupt face for engagement with a lug 34 on a collar 35 to hold the hammer in cocked position, and a leaf-spring 36 has its end in engagement with said lug 34 to hold the same in position to be engaged by the lug 33 on the hammer. The collar 35 is mounted on a bolt 37, as is also a trigger 38, provided at its under edge with a recess 39, in which is engaged one end of a bolt 40, carried by the bifurcated end of a rod 41. Between the ears formed by the bifurcation of the rod 41 is pivoted on the bolt 40 a trip 42, arranged to contact with a second lug 43 on the collar 35 when the trigger 38 is pulled back to release the lug 34 from the hammer 29, as will be readily understood. A spring 45 is provided to hold the trip 42 normally in position to engage the lug 43.

A bore 44 is provided in the rear end of the stock 1, and in the bore is slidably engaged a bolt 45, which is normally held in the upper end of the bore by means of a helical spring 46, which is held in the bore by means of a screw-plug 47. A lever 48 is pivoted in the stock above the bore 44 and is provided at its lower end with a lug 49, the under edge of which is inclined forwardly and engages a shoulder 50, formed by a recess in the side of the bolt 45. The end of the rod 41 is in engagement with the upper end of the bolt 45, and a spring 51 is secured to the lever 48 and engages the rear end of the stock 1.

It will be readily understood that the rod 41 may be released, thereby releasing the trigger, by pressing the lever 48 in toward the stock, causing the lug 49 to engage the shoulder 50 and lower the bolt 45.

It will be seen that by simply grasping the stock the lever 48 will be operated to release the trigger-locking mechanism. To hold the lever 48 in position to lock the trigger, a bolt 52 is provided. One side of the bolt is concaved to allow for the passage of a lug 53 when it is not desired to hold the bolt 45 in the path of the rod 41. The lever 48 is concaved in rear of the lug 53, and in order to lock the lever 48 the bolt 52 is turned by means of the finger-piece 54 until the convex side of the bolt is seated in the concave portion of the lever 48.

Pivoted in the guide-block 5 is a locking-bolt 55 for the breech-block 4. A link 57 is pivoted to the locking-bolt 55 by means of a pin 59 and to the stock by means of a screw 60, and secured to the stock and in engagement with the under side of the locking-bolt is a spring 60'.

Disposed below the breech-block and in the stock 1 is a magazine 61, which is held therein by means of a spring-latch 62, which engages a notch 63 in the magazine 61. The spring-latch 62 is held in the stock by means of a screw 64, and a stop-pin 65 is provided to limit the movement of the latch. The magazine 61 is closed at the bottom and open at the top and is provided at its rear upper edge with an ejector-lug 66, which is engaged in the groove 30 in the breech-block 4. Slidably mounted in the magazine 61 is a follower 67, and secured to the rear end of the same is a stop 68, which when the last shell has been fired projects in the path of the breech-lock and prevents operation of the arm until it is depressed.

In Fig. 11 a modified form of extractor-latch is shown. In this case the latch comprises a leaf-spring 69, secured to the breech-block by means of a screw 70 and provided upon its free end with an ejector-lug 71.

The recoil from the first cartridge fired moves the breech-block 4 rearwardly into the guide-block 5 against the tension of the spring, the locking-bolt 55 being disengaged from the breech-block by the link 57, it being understood that the barrel, the breech-block, and the guide-block have an initial backward movement which is sufficient to disengage the locking-bolt 55 from the breech-block 4, as stated.

What is claimed as new is—

1. In a firearm the combination with a stock, a firing mechanism located within the stock, said firing mechanism including a trigger, of a bolt slidably mounted in the stock, a bar connected with the trigger and arranged to engage the bolt when the same is at one limit of its movement, and means for moving the bolt to a position for such engagement, said means being arranged for actuation when the stock is grasped.

2. In a firearm, the combination with a stock, a barrel slidably mounted thereon, a firing mechanism including a trigger, of a bar slidably mounted within the stock and connected with the trigger, a bolt arranged to prevent movement of the trigger through engagement by the bar, and means for releasing the bolt from such engagement.

3. In a firearm, the combination with a stock, a barrel, slidably mounted thereon, a firing mechanism including a trigger, of a bar slidably mounted within the stock and connected with the trigger, a bolt arranged to prevent movement of the trigger through engagement by the bar, and a lever for releasing the bolt from such engagement.

4. In a firearm, the combination with a stock, a barrel slidably mounted thereon, a firing mechanism including a trigger, of a bar connected with the trigger, a bolt arranged for engagement by the bar to prevent movement of the trigger, a lever for moving the bolt out of such engagement, and means for locking the lever against operation.

5. In a firearm, the combination with a stock, a barrel slidably mounted thereon, a firing mechanism including a trigger, of a bar connected with the trigger, a bolt arranged for engagement by the bar to prevent movement of the trigger, a lever for moving the bolt out of such engagement, and a turn-button for locking the lever against operation.

In testimony whereof I affix my signature in presence of two witnesses.

RICHARD E. FLYBERG.

Witnesses:
E. C. HELLAND,
D. W. FULTON.